United States Patent [19]

Ekholm

[11] 3,999,684
[45] Dec. 28, 1976

[54] DEVICE FOR FEEDING PIECES OF LUMBER ONE BY ONE

[75] Inventor: Rolf Ekholm, Nyland, Sweden

[73] Assignee: AB Hammars Mekaniska Verkstad, Nyland, Sweden

[22] Filed: June 20, 1975

[21] Appl. No.: 588,728

[30] Foreign Application Priority Data

July 4, 1974 Sweden .......................... 7408816

[52] U.S. Cl. .............................. 221/301; 193/40; 198/530
[51] Int. Cl.² .......................................... B65H 3/30
[58] Field of Search ................... 198/26, 34, 21; 221/289, 290, 298–301; 214/1 PB; 193/32, 40

[56] References Cited

UNITED STATES PATENTS

| 309,103 | 12/1884 | Schofield | 221/301 |
|---|---|---|---|
| 747,161 | 12/1903 | Gillard | 221/298 |
| 2,160,319 | 5/1939 | Swartz | 198/26 |
| 2,604,577 | 7/1952 | Strickland et al. | 221/298 |
| 2,666,462 | 1/1954 | Richardson | 221/301 |
| 2,751,781 | 6/1956 | McConnell | 198/26 |
| 2,903,116 | 9/1959 | Jessup et al. | 193/40 |
| 3,235,101 | 2/1966 | Milhaupt | 198/26 |
| 3,330,401 | 7/1967 | Ahlstedt | 193/32 |
| 3,651,921 | 3/1972 | Hill | 198/34 |
| 3,812,951 | 5/1974 | Fullaway | 198/26 |

Primary Examiner—Johnny D. Cherry
Assistant Examiner—Jeffrey V. Nase
Attorney, Agent, or Firm—Silverman & Cass, Ltd.

[57] ABSTRACT

A device for feeding pieces of lumber, one by one, from one location to another location and comprising a plurality of carrier members secured in substantially parallel relation along the length of a frame which bridges between an input location and a delivery location. Each of the carrier members are formed to define a downwardy inclined slope having a stop at the lower end thereof. The upper end of the slope is adapted to receive lumber from the input. An elongate shaft is journaled through the carrier members. A clinch member is rotatably journaled on said shaft and located adjacent each of the carrier members. A stopping arm is provided disposed between each carrier member and adjacent clinch. A pivot pin is attached to each carrier member and a guide pin is carried by each clinch, the stopping arm is rotatably journaled on the pivot pin, one end of the stopping arm being movably engaged with the guide pin and the other end carrying a stop formation. The stopping arm is movable relative to the clinch between one position where the stop formation is above the adjacent slope and a second position where the stop formation is below the adjacent slope depending upon the position of the clinch, the clinch having a V-shaped recess and a substantially circular stop edge, the clinch being movable to place to stop edge sequentially below the slope and above the slope.

9 Claims, 4 Drawing Figures

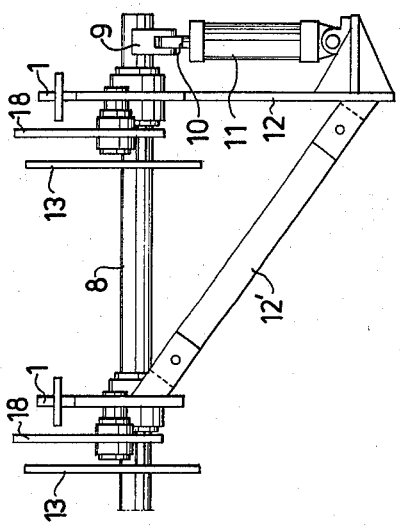
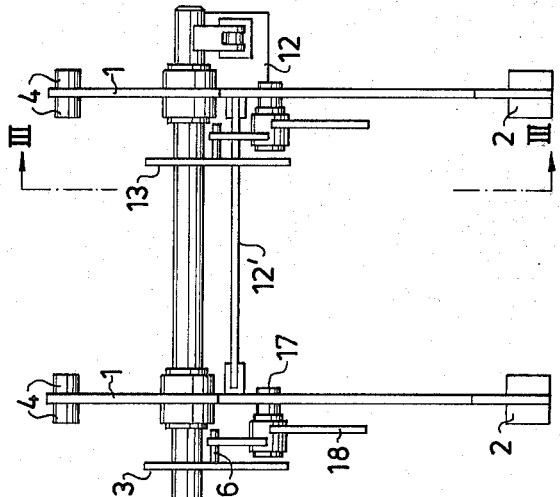
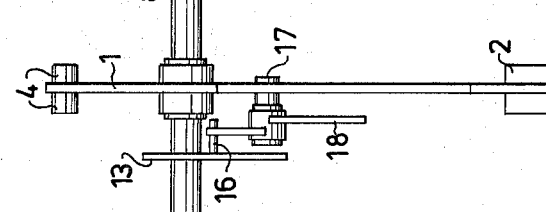
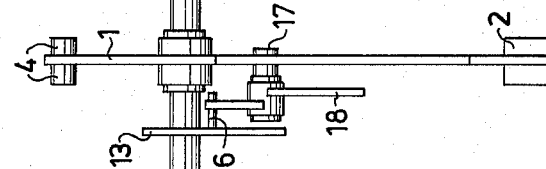
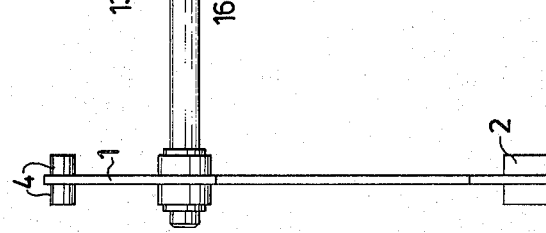

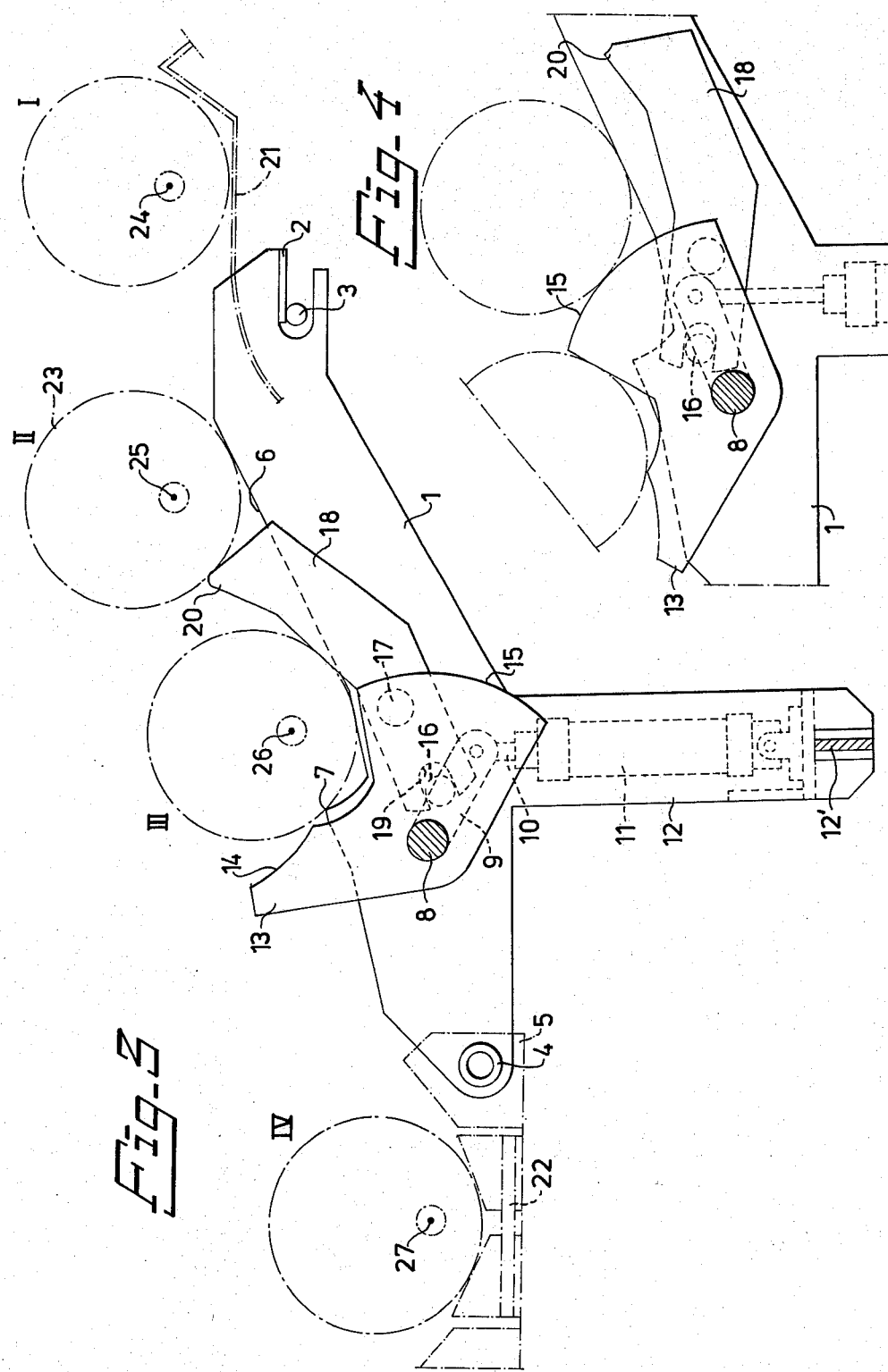

DEVICE FOR FEEDING PIECES OF LUMBER ONE BY ONE

The present invention relates to a device of the kind that receives and feeds pieces of lumber, one by one, to another device, such as a conveyor, for the next process, such as measurement, of the lumber in a lumber processing plant.

Known devices for feeding pieces of lumber one by one have the disadvantage, that their seizing pieces of lumber, one by one, and feeding them to a device for the next process of the lumber can not be done at the same high speed as the rest of the plant has. Therefore, such a feeding device can be a so called bottle-neck in the processing plant.

It is an object of the invention to provide a device that can feed pieces of lumber, one by one, from one device to another device at a speed which is just as high as the speed of the rest of devices in the lumber processing plant.

The invention is characterized by the fact that the device for feeding pieces of lumber one by one comprises several elongate, coaxially, equally spaced carriers resting on a frame preferably with their ends, the upper sides of said carriers forming a slope in the feeding directing, said slope ending by a stop at the lower part thereof, a carrier shaft journalled in the carriers and provided with an operating arm connected to a driving device driveable in two directions, preferably a hydraulic device with a piston and a cylinder, whereby said operating arm can be swung within certain limits and the carrier shaft can be rotated, a clinch attached to said carrier shaft at the side of substantially all the carriers, said clinch having a V-shaped recess and a substantially circular stop edge moveable between a position below the slope and a position, the stop position, above the slope with rotation of the clinch, a stopping arm provided between each clinch and the adjacent carrier, said stopping arm being rotatably journalled on a pivot pin attached to said carrier and having one end movably engaged with a guide pin on the adjacent clinch and the other end in form of a stop, said stop being movable between a position, the stop position, above the adjacent slope and a position below said slope depending on the position of the clinch, whereby the pieces of lumber are fed one by one in substantially two short steps that are close to each other.

The invention is illustrated by an embodiment shown on the attached drawings as an example.

FIG. 1 is a side view of a part of the device according to the invention.

FIG. 2 shows the device as seen from above, one central part being deleted.

FIG. 3 shows on a larger scale a vertical section at the line III—III in FIG. 2.

FIG. 4 shows a part of the device according to FIG. 3 but with movable elements in other positions.

The device according to the invention comprises a number of, for example eight, vertical, flat, elongate carriers 1. At one end each of said carriers are provided with a plate 2 supported by a fixed supporting bar 3 attached to a frame not shown but preferably belonging to a transverse conveyor. At the other end each of said carriers are provided with a couple of shaft pivots 4 also supported by a fixed frame 5, only part of which being shown by dash-and-dot lines. The upper surface of each carrier form a slope 6 in the intended feeding direction and a stop 7 at the lower part of said slope.

A carrier shaft 8 extends through all the carriers 1 and is rotatably but axially undisplaceably journalled therein. At one end of said carrier shaft 8 an operating arm 9 is provided, said operating arm being connected to the piston rod 10 of a hydraulic-cylinder 11. One end of said hydraulic cylinder 11 is connected to a bracket 12 by a universal joint, said bracket being braced by a bar 12.

On the carrier shaft 8 close to each carrier 1 except for the leftmost one in FIG. 2 a clinch 13 is attached, said clinch having a V-shaped recess 14 and a circular stop edge 15 having the carrier shaft as center. A guide pin 16 is attached to the clinch 13.

Each carrier except for the leftmost one in FIG. 2 supports a pivot pin 17, on which a stopping arm 18 is journalled. One end of said stopping arm is provided with a recess 19, in which said guide pin 16 is arranged movably within certain limits, and the other end forms a stop 20.

The right end of each carrier 1 (FIG. 3) is connected to a transverse conveyor for feeding pieces of lumber, of which conveyor only a part is shown by a dash-and-dot line 21. The left ends of the carriers 1 are connected to for example a longitudinal conveyor, of which only a part is shown by dash-and-dot lines 22.

The function of the feeding device according to the invention is as follows. In FIG. 3 four different positions with the reference numbers I–IV for pieces of lumber 23 are shown, said pieces of lumber being shown by dash-and-dot lines. The piece of lumber in position I is positioned on the transverse conveyor 21, the piece of lumber in position II lies on the slope 6 against the stop 20, the piece of lumber in position III lies in the recess 14 of the clinch 13, and the piece of lumber in position IV lies on the longitudinal conveyor 22. At each of positions I–VI there is provided a photo cell device 24–27 only schematically shown, the photo cells of which can be arranged in several different ways and in different positions and connected to some electric device for controlling the feeding pace of the pieces of lumber.

When pieces of lumber have reached positions II and III and thus lie against the stops 20 and in the recesses 14 of the clinches respectively, the pushing out of the piston 10 will start under influence of one of the photo cells, so that the operating arm 9 will be swung up, see FIG. 3. Hereby the carrier shaft 8 will be rotated and rotate all the clinches and the piece of lumber lying therein in a counter-clockwise direction and over the stop 7, see FIG. 4, and thereafter the piece of lumber will leave and roll or slide down to position IV.

During the swinging movement of the clinches 13, each of their guide pins 16 has caused a swinging movement of each respective stopping arm 18, see FIG. 4, so that the stops 20 are located below the slopes 6. Hereby the piece of lumber previously lying in position II can roll or slide down to the swung up, circular stop edges 15, see FIG. 4. Under influence of one of the photo cells the piston 10 will thereafter be pushed into the cylinder 11 and the operating arm 9 will be swung down, so that the clinches 13 will be rotated in a clockwise direction to the position shown in FIG. 3. Hereby the piece of lumber that rested against the circular stop edges 15 can move to the stops 7 and into the clinch recesses 14. At the same time the stops 20 of the stopping arms 18 have been raised above the slopes 6 stopping a piece of lumber coming from position II into position II. Immediately thereafter the clinches 13 start moving ahead the piece of lumber lying in the recesses of the clinches.

From a piece of lumber has been fed to the stop 20 by the tranverse conveyor 21, it is in a first stop fed therefrom to the circular stop edges 15, and in a second step therefrom to the longitudinal conveyor 22 or some other receiving device.

The device for feeding pieces of lumber one by one according to the invention has the advantage that it feeds a piece of lumber in two short steps, which take place one close to the other, whereby the device described above makes it possible to raise the feeding capacity of the processing plant by about 60%. The feeding device according to the invention furthermore has the advantage that its moveable parts are simple and can be made with great dimensions in order to resist the weight of the pieces of lumber and possible impacts without being broken and thereby giving cause to any process stoppage.

The feeding device according to the invention can of course be modified within the scope of the invention. For example the carriers can have another shape than shown, only provided that they have a slope with a stop, a bearing for the carrier shaft and a pivot pin for the stopping arm. The hydraulic device 10, 11 can be displaced by another driving device having two directions. Also the photo cell device and the electric equipment belonging thereto for controlling the movable parts of the feeding device at a certain pace can be modified.

What we claim is:

1. A device for feeding pieces of lumber one by one from a feeding location to a delivery location, several longitudinal, generally parallel, coaxial, equally spaced carriers arranged with their ends resting on a frame, each of said carriers having an upper side including a sloped portion, said sloped portion having a lower portion and a stop formed at said lower portion, the carriers arranged with their sloped portions downwardly inclined from the feeding direction, a rotatable carrier shaft journalled in the carriers, an operating arm having one end coupled to the carrier shaft and an opposite end, a driving device drivable in two directions, for moving said operating arm swingably within defined limits, rotatable clinches attached to said carrier shaft adjacent said carriers, each said clinch having a V-shaped recess and a substantially circular stop edge movable between a position below the slope and a stop position above the slope with rotation of the clinch, a stopping arm arranged between each clinch and adjacent carrier, a pivot pin attached to said carrier and a guide pin carried by each clinch, said stopping arm having opposite ends, said stopping arm being rotatably journalled on said pivot pin, one end of said stopping arm being movably engaged with said guide pin carried by the adjacent clinch and the other end having a stop formation, said stopping arm being movable relative to said clinch between first and second positions to place said stop formation above the adjacent slope at said first position and below the adjacent slope at said second position said clinches being below the adjacent slopes when the stop formations are in their first position and above the slopes when the stop formations are in their second position whereby the stop formations interfere with passage of pieces of lumber therepast when the clinches are inactive and are noninterfering when the clinches assume their interfering position above the slopes so as to effect one by one feeding of the pieces of lumber in two short steps that are close to each other.

2. A device as claimed in claim 1 in which said driving device comprises a hydraulic device having a cylinder and a piston reciprocable within said cylinder, said piston being connected to said other end of said operating arm.

3. A device for feeding elongated articles individually to a delivery location, said device comprising, a plurality of carriers arranged coaxially, spaced side by side, each carrier having an upper end and a lower, opposite delivery end, a frame for supporting the opposite ends of said carriers, said carriers having upper sides defining a slope in the delivery direction, the terminus of said slope being located between said ends, said upper sides further defining a stop portion at the lower terminus of said slope, a shaft journaled through said carriers at a location between the ends of said carriers, a plurality of clinches, each secured on said shaft adjacent the respective carrier, each clinch having an edge configuration including an arcuate end portion and a V-shaped recess portion, means for rotating said clinches together about the axis of said shaft between an ejecting condition and a passive condition relative to the terminus of said slope, said arcuate end portion being interferent to passage of articles along the slope during ejecting condition, stop means secured to said carrier disposed between the clinch and an adjacent carrier, said clinch and stop means having a cooperative coupling means therebetween for effecting movement of said stop means on rotation of said clinches whereby said stop means are movable between an interferent condition relative to passage of articles along said slope at a location spaced from the terminus thereof and a non-interferent condition, said stop means assuming said interferent condition when the clinches assume their passive condition and assuming their non-interferent condition when the clinches assume their ejecting condition.

4. The device as claimed in claim 3 in which said carriers are equally spaced.

5. The device as claimed in claim 3 in which the number of clinches are less the number of carriers.

6. The device as claimed in claim 3 in which said means for rotating includes an operating arm secured to said shaft at one end thereof, drive means including a reciprocating member and said operating arm secured pivotally to said reciprocating member for limited pivotal movement about said shaft axis.

7. The device as claimed in claim 6 in which said cooperative coupling means comprises a pin secured to a clinch and means defining an end slot carried by said stop means, said pin being received within said end slot.

8. The device as claimed in claim 7 in which said stop means comprise an arm rotatable about its mounting axis and having said end slot at one end thereof and a stop portion at the opposite end thereof, the end carrying the end slot being movable with rotation of said clinch and about an axis parallel to but spaced from said shaft axis.

9. The device as claimed in claim 3 in which said carriers, clinches and stop means comprise generally planar members arranged in parallel planes.

* * * * *